Feb. 10, 1948. W. D. ALLISON 2,435,814
WHEEL SUPPORTING STRUCTURE
Filed Oct. 23, 1944 2 Sheets-Sheet 1
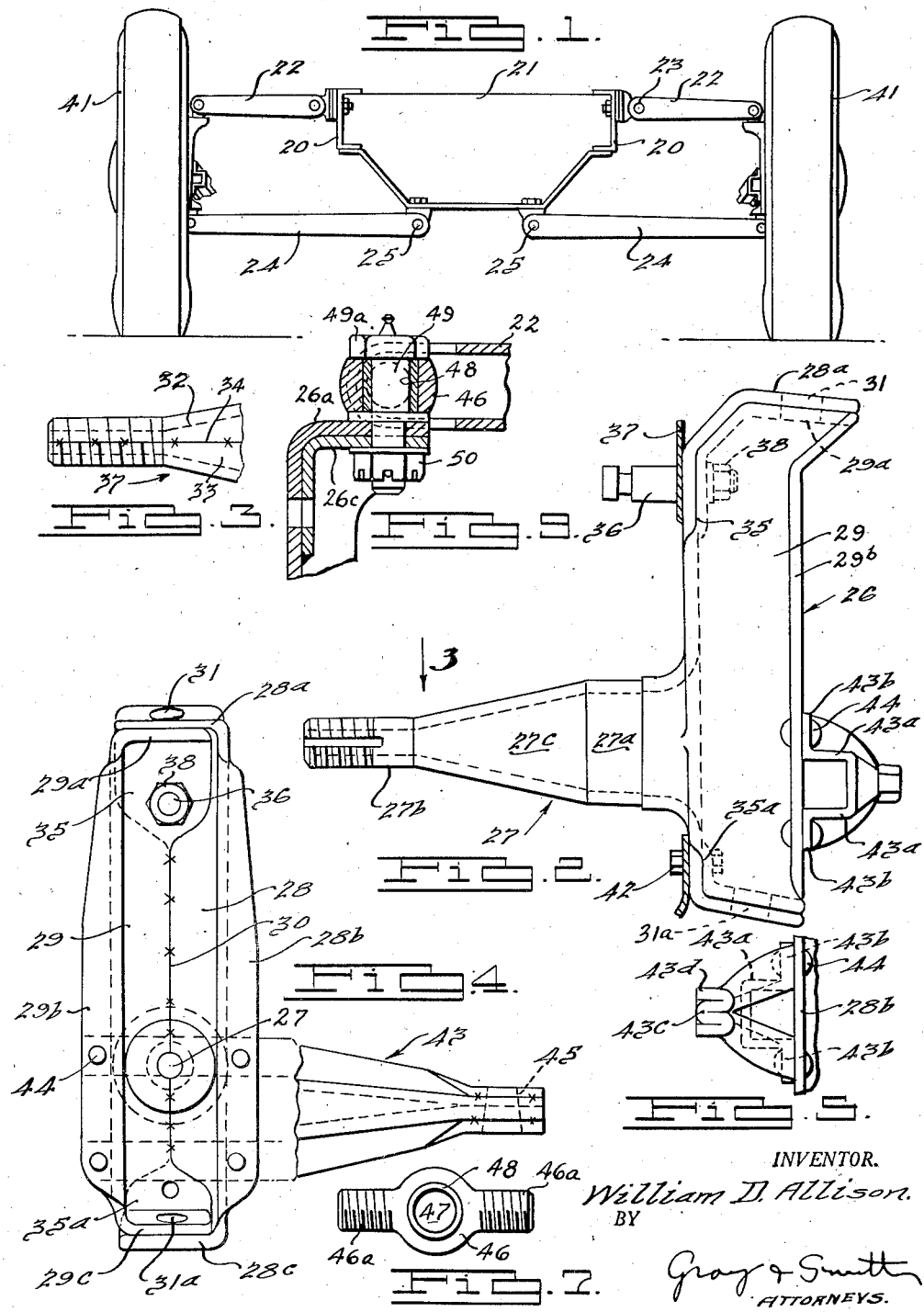

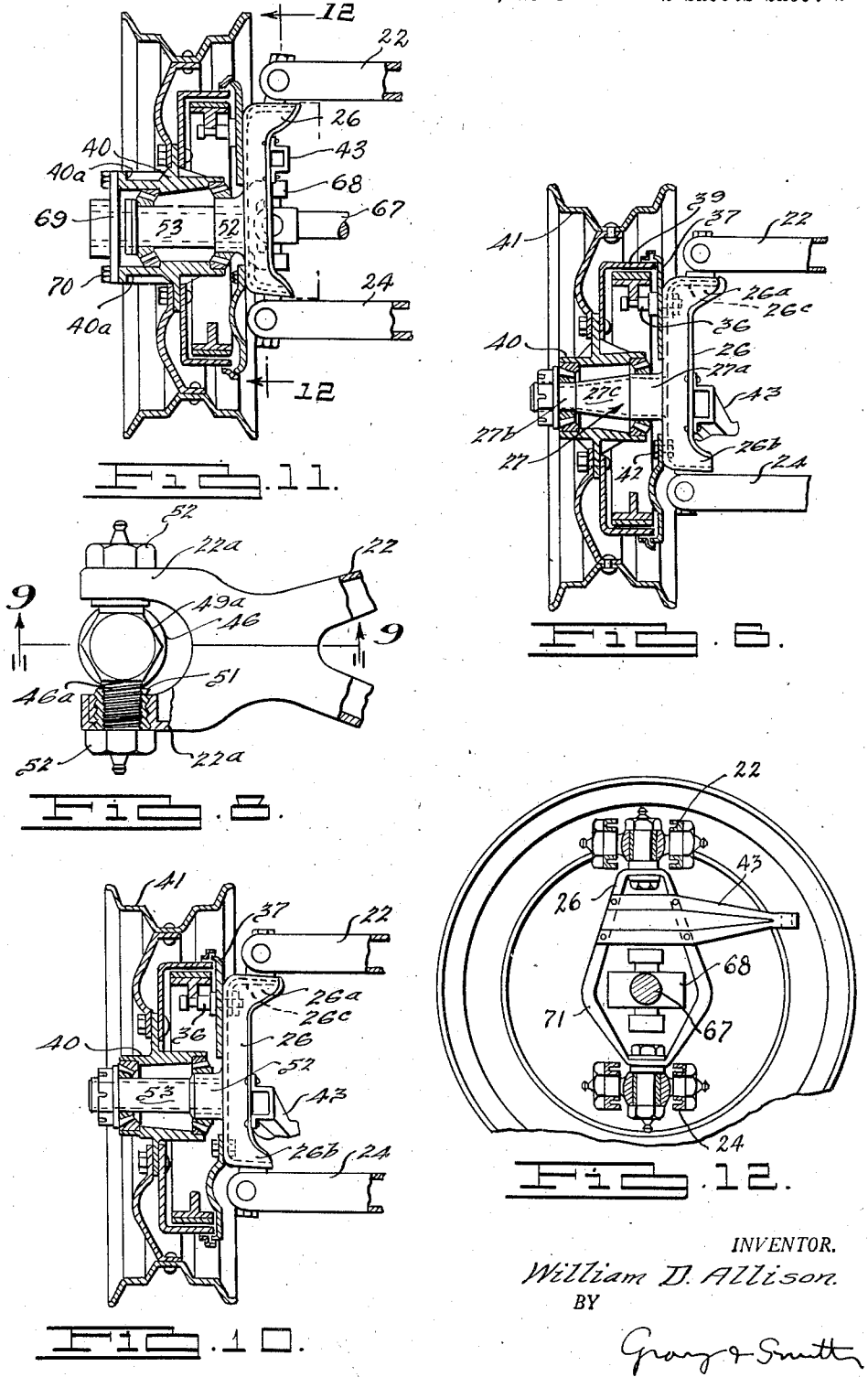

Patented Feb. 10, 1948

2,435,814

UNITED STATES PATENT OFFICE 2,435,814

WHEEL SUPPORTING STRUCTURE

William D. Allison, Detroit, Mich.

Application October 23, 1944, Serial No. 560,063

12 Claims. (Cl. 280—96.1)

This invention relates to supporting means for the dirigible wheels of vehicles, particularly automotive vehicles, and pertains especially to improvements in the mounting of the front wheels of an automobile having an independent spring suspension for such wheels of the parallelogram type embodying generally upper and lower suspension arms pivoted at their inner ends to the chassis frame or body and hingedly connected at their outer ends by a bracket or arm which carries the wheel spindle.

Heretofore it has been the conventional practice to mount the wheel spindle support arm or bracket by means of a king pin and suitable bearings therefor located at the outer side of the spindle support arm, this construction permitting rotation or turning of the spindle laterally in a substantially horizontal plane in order to enable the vehicle to be steered. This construction, commonly used in connection with the front wheels of motor vehicles, provides an assembly which is not only complicated but costly in construction requiring many accurate machining operations and the use of numerous forging and other small parts. These and other disadvantages of conventional mountings for the front wheels of motor vehicles are overcome by the present invention which has for an important object thereof the provision of a more compact, economical and efficient means for mounting the independently sprung wheels of the vehicle.

A further object of the invention is to provide improved mounting or supporting means for the wheels of a vehicle, particularly independently sprung wheels, said means including an upright support bracket preferably of channel shape to which the wheel supporting spindle, or a portion thereof, is rigidly or integrally attached, and the bracket together preferably with at least a portion of the spindle being formed from two pressed metal sections rigidly secured together as by butt welding to provide a light, relatively simple, economical and strong construction.

A further object of the invention is to rigidly combine as a unit the upright wheel support arm and wheel spindle, or a portion thereof, forming the connection between the outer ends of the upper and lower swinging suspension arms, suitable bearings being provided at the top and bottom of the wheel support arm to permit horizontal rotation of the wheel support arm for steering the vehicle and suitable bearings also being provided at the top and bottom of the wheel support arm to permit vertical motion of this arm in conjunction with the upper and lower swinging suspension arms. This improved construction not only materially reduces weight and simplifies the mechanism for mounting the wheel but is also of importance in cases where driving power is to be applied to the wheels by means of axle shafts and universal or constant velocity joints mounted substantially on the axis of the wheel spindle.

A further object of the invention is to provide an improved construction by virtue of which the radial load on the king pin bearings will be reduced thereby prolonging their life, ensuring easier steering action, permitting the use of smaller bearings and reducing camber and caster changes resulting from worn bearings. The radial load on the king pin bearings is inversely proportional to the distance between the bearings and is determined by the distance from the bearings to the line of load application to the wheel. In accordance with the present invention the king pin bearings are considerably further apart than in conventional mountings and, in fact, may be approximately twice as far apart. As a result the radial load per bearing in a wheel mounting embodying the present invention will be considerably less than in conventional practice and, in fact, may well be at least approximately one-half the radial load on the king pin bearings in wheel supporting structures of conventional design.

A still further object of the invention is to provide an improved supporting structure or mounting for the wheels of vehicles, particularly automobiles, in which the wheel spindle and upright supporting bracket interposed between the swinging wheel suspension arms are formed as a rigid unit which is constructed and formed in improved manner to provide a means for direct attachment thereto of the brake backing plate at points spaced outwardly of the spindle.

Other objects of this invention will appear in the following description and appended claims, reference being had to the accompanying drawings forming a part of this specification wherein like reference characters designate corresponding parts in the several views.

Fig. 1 is a front elevation illustrating a pair of dirigible independently sprung wheels mounted to the frame of the vehicle in accordance with the present invention.

Fig. 2 is a side elevation of a unitary support bracket and wheel spindle constructed of stampings in accordance with one embodiment of the invention.

Fig. 3 is a fragmentary plan view taken substantially in the direction of the arrow numbered 3 in Fig. 2.

Fig. 4 is a fragmentary elevation taken from the inner side of the upright wheel supporting bracket of Fig. 2.

Fig. 5 is an enlarged end view of the steering arm shown in Fig. 4.

Fig. 6 is a side elevation, partly in section, of the wheel assembly.

Fig. 7 is a plan view of the king pin connecter bearing member interposed between the upper or lower end of the wheel support arm and suspension arm.

Fig. 8 is a fragmentary plan view, partly in section, illustrating the connection between the upper suspension arm and the upright spindle carrying support arm or bracket.

Fig. 9 is a section taken substantially through lines 9—9 of Fig. 8 looking in the direction of the arrows.

Fig. 10 is a view somewhat similar to Fig. 6 illustrating a modified construction.

Fig. 11 is a view somewhat similar to Fig. 10 illustrating the invention as applied to a front wheel drive.

Fig. 12 is a sectional view taken substantially through lines 12—12 of Fig. 11 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In Fig. 1 there is illustrated somewhat diagrammatically a suspension of the parallelogram type for the dirigible wheels, such as the front wheels, of an automobile. In this view the conventional coil springs interposed between the upper and lower suspension arms are omitted for the purposes of clarity. The spaced longitudinal side frame sills of the vehicle are indicated at 20, these sills being rigidly connected together adjacent their front ends by a cross-frame member 21. Each wheel is provided with an upper suspension arm 22 pivoted or hinged at 23 to the vehicle frame and is also provided with a lower suspension arm 24 hinged at its inner end at 25 to the bottom of the cross-frame member 21. The upper and lower wheel suspension arms 22 and 24 are adapted to swing in parallelism about their hinge connections 23 and 25 on the frame in response to vertical movements of the wheels during operation of the vehicle. In accordance with the present invention the outer ends of the suspension arms are hinged to the upper and lower ends of an upright wheel support arm or bracket to permit relative motion of these parts about horizontal axes. In addition, the upper and lower ends of the wheel support bracket are connected to the suspension arms 22 and 24 by means of spaced king pins permitting the entire wheel support bracket to turn in a generally horizontal plane for the purpose of steering the vehicle.

Referring to the embodiment illustrated in Figs. 1 to 9 inclusive, there is illustrated at 26 an upright spindle carrying wheel support bracket or arm providing the connection between the outer ends of the upper and lower suspension arms 22 and 24. Extending outwardly from the bracket 26 and forming a rigid unitary part thereof is a wheel spindle 27. In the present embodiment of the invention the bracket 26 and wheel spindle 27 are formed in two parts or halves 28 and 29 permanently secured together as by welding. The parts 28 and 29 are pressed or stamped from suitable heavy gauge sheet steel to provide, when welded together, the bracket portion 26 in the form of a vertically extending inwardly opening channel and the wheel spindle 27 in the form of a tubular member. The stampings 28 and 29 are formed with vertically extending abutting edges at the outer side or central web of the bracket 26, which are butt-welded together at 30, see Fig. 4. At their upper ends the members 28 and 29 are formed with overlapping portions 28a and 29a pierced to provide a king pin hole 31.

At their lower ends the stampings 28 and 29 are formed with corresponding overlapping portions 28c and 29c also pierced to provide a bottom king pin hole 31a. Since the upright support bracket is in the form of an inwardly opening channel the spaced side flanges thereof extend inwardly from the outer central web of the channel, and the inner vertical edges of these side flanges are turned outwardly in opposite directions to provide edge flanges 28b and 29b. The stampings 28 and 29 are also formed integrally with the two projecting sections 32 and 33 of the spindle 27 which are butt-welded along their opposite meeting edges at 34 as illustrated in Fig. 3. The portions 32 and 33, which are welded together to provide the wheel spindle, are suitably shaped to form cylindrical bearing portions 27a and 27b adjacent opposite ends of the spindle and an intermediate tapered portion 27c.

It will be noted that the outer walls of the channel bracket 26 immediately above and below the line of weld 30 are formed with flat overlapping portions 35 and 35a which are rigidly secured together. The upper overlapping portions at 35 support the brake anchor bolt 36 which extends therethrough and provides means for rigidly securing the brake backing plate 37 to the upper outer side of the bracket 26, the anchor bolt passing through the overlapping portions at 35 and being secured rigidly in position by a nut 38. As illustrated in Fig. 6, the brake backing plate 37 is rigidly secured to the lower end of the bracket 26 below the spindle 27 by an attaching bolt 42 passing through the overlapping portions at 35a. As illustrated in Fig. 6, the wheel hub 40 for the wheel 41 is supported upon the spindle 27 through the medium of conventional roller bearings supported upon the bearing areas 27a and 27b.

From the foregoing it will be seen that the wheel support bracket 26 and wheel spindle 27 comprise two unitary stampings which are welded together to form a single structural unit adapted to revolubly support the wheel 41 and to turn therewith when it is desired to steer the vehicle. Furthermore, it will be noted that the bracket 26 is constructed in improved manner so as to enable the brake backing plate 37 to be attached directly thereto at relatively widely spaced points above and below the wheel spindle.

In accordance with the present invention the steering mechanism for the wheels 41 is connected directly to the wheel support brackets 26. As illustrated in Figs. 2, 4 and 5 each steering arm 43 is pressed or rolled from sheet steel into channel form having parallel side flanges 43a terminating in outturned attaching flanges 43b rigidly secured to the flanges 28b and 29b of the bracket 26 by rivets 44. As shown particularly in Figs. 4 and 5, the side flanges 43a gradually converge outwardly, and at the outer end of the steering arm these flanges are brought together into direct contact as shown at 43c. The outturned flanges 43b at the outer end of the steering arm are folded back upon the intermediate flanges 43c as shown at 43d in Fig. 5. Thus, the outer end of the steering arm comprises in effect four thicknesses of the metal produced by the pressed or pinched together flange portions 43c and 43d which are welded together to provide a steering arm end portion of considerable strength and rigidity. This end portion is pierced to provide a hole 45 to receive the tie rod end connection, the tie rod extending across the front of the vehicle and connecting the ends of the steering arms in accordance with conventional practice.

The connections between the upper and lower ends of each wheel support bracket 26 and the wheel suspension arms 22, 24 are such as to permit relative rotation of the bracket and suspension arms about both horizontal and vertical axes, thus enabling the vehicle wheels to be steered and also to move vertically in response to irregularities in the road. Referring to Figs. 7, 8 and 9, there is provided between the upper end of the bracket 26 and the upper suspension arm 22 a member 46 which may for convenience be termed a king pin connecter bearing or member. This member, as shown in Fig. 7, has an enlarged central portion provided with a hole 47 within which is pressed a bushing 48 to receive a vertically extending king pin 49. The upper end of the king pin terminates in a wrench receiving head 49a and this king pin, as shown in Fig. 9, passes through the hole 31 in the upper end of the bracket 26 and is secured in position by means of a nut 50 and a washer interposed between the nut and the underside of the overlapping portions 28a, 29a of the bracket. From this construction it will be seen that the bracket is capable of turning about the vertical axis of the king pin 49 which has a bearing within the bushing 48 in the transverse connecter member 46. This member, as shown in Fig. 7, is provided with oppositely extending threaded shank portions 46a which pass through alined holes in the outer bifurcated end portions 22a of the upper suspension arm 22. As shown in Fig. 8, threaded tubular bearing members 51 are interposed between the portions 46a and 22a, each of these bearing members being screwed onto the threaded shank 46a and having external threads cooperating with threaded portions carried by the ends 22a of the suspension arm which permit the arm to rotate on the bearings 51 about a transverse horizontal axis extending through the connecter member 46. The ends of the connecter member, which pass through the bifurcated ends of the suspension arm 22, are secured thereto by nuts 52.

From the foregoing construction it will be seen that the upper suspension arm 22 is rotatable upon the ends of the connector bearing member 46, thus permitting relative turning motion of the suspension arm and bracket 26 about a horizontal axis. Furthermore, rotation of the connecter bracket 26 in a horizontal plane relative to the suspension arm is permitted through the medium of the king pin bearing 49 mounted within the connecter member 46. The connecting means between the outer end of the lower suspension arm 24 and the bracket 26 is substantially the same as that at the upper end of the bracket as above described with the exception that the position of the parts is reversed in the manner illustrated in Fig. 13.

In the construction illustrated in Figs. 6 and 9 the method of fabrication of the unitary supporting bracket and spindle 26, 27 differs somewhat from that illustrated in Figs. 2 and 4. Although in Fig. 6 the bracket and spindle are formed from two sheet metal sections or halves, as previously described, these sections are not provided with the overlapping reinforcing portions 28a, 29a, 28c and 29c. Instead the sheet metal sections are butt-welded together on continuous weld lines extending along the top and bottom of the spindle 27 and along the outer face and across the upper offset ends 26a and 26b of the bracket. The upper end of the bracket 26 may be reinforced interiorly by means of an angle member 26c spot-welded in position so as to strengthen the bracket for the purposes of supporting the brake anchor bolt 36 and the upper king pin mounting. A similar reinforcing angle may be spot-welded in position, if desired, within the lower end of the bracket 26 so as to provide reinforcement in this locality for the mounting of the lower king pin and the attachment of the brake backing plate 37 at 42. Other than the foregoing the construction illustrated in Fig. 6 corresponds to that previously described in connection with Figs. 2 and 4.

Referring to the embodiment illustrated in Fig. 10, the upright support bracket 26 is fabricated in substantially the same manner as the construction shown in Fig. 6, being formed of two angular sheet metal sections which are butt-welded together along the outer face of the bracket and across the upper and lower offset ends 26a and 26b thereof. The stamped sections, which form the bracket 26, are in this instance provided with relatively short outwardly extending sections which are butt-welded together along their upper and lower meeting edges to provide a tubular spindle portion 52. The remainder of the spindle is formed by means of a cylindrical tube 53 telescoped within the tubular portion 52 and welded thereto. The hub 40 of the wheel 41 is supported through the usual taper roller bearings upon the cylindrical portions 52 and 53 of the spindle. As in the previous embodiments, the brake backing plate 37 is bolted to the outer face of the bracket 26 at points above and below the spindle and the upper end of the bracket is preferably reinforced by means of an angle member 26c, as in the structure shown in Fig. 6, in order to strengthen the mounting for the anchor bolt 36. Thus, in the embodiment of Fig. 10 the upright wheel supporting bracket or arm 26 is formed in two sections or halves which are placed together with their edges in abutting relation and are welded together along these meeting edges. This bracket is integrally formed with a portion 52 of the wheel spindle and the remainder of the spindle is formed by means of a steel tube 53 telescoped into the portion 52 and welded thereto.

Figs. 11 and 12 illustrate the manner in which the invention may be readily applied to a motor vehicle in which the front dirigible wheels are power driven. In this embodiment the upright supporting bracket 26 and the wheel spindle are constructed in accordance with the embodiment illustrated in Fig. 10, the bracket and spindle portion 52 being formed from two similar pressed metal sections butt-welded together along their meeting edges and the remainder of the spindle being formed by the tube 53 extending into and welded to the spindle portion 52. In this construction the spindle, comprising parts 52 and 53 rigidly secured together, is hollow and of an inside diameter sufficient to permit the driving shaft for the front wheel to extend freely therethrough. The driving shaft 67 is provided for each of the front wheels and is driven from the crank shaft of the engine, the shaft being made in two sections connected together by a suitable constant velocity universal joint 68. The outer end of the drive shaft projects beyond the spindle 53 and is rigidly secured to a cross-head 69 which in turn is bolted at 70 to an extended portion 40a of the wheel hub 40. From this construction it will be readily seen that the front wheels of the vehicle may be driven in simple and efficient manner by extending the driving shafts axially through the wheel spindles and attaching them at their outer ends to the wheel hubs. Each supporting bracket 26 is in the form of an inwardly opening channel, as in the previous embodiments. However, in the construction shown in Figs. 11 and 12 the sides of the channel are widened out at 71 to provide ample space for the reception and operation of the universal joint 68 which is partially housed within the channel. The upper and lower suspension arms 22 and 24 are connected to the upper and lower ends of the support bracket 26 through the medium of alined king pins 49 and also connecter members 46 and associated parts in the same manner as shown and described in connection with the other embodiments of this invention. It will thus be seen that relative pivotal motion of the suspension arms and the support bracket 26 about horizontal axes is permitted in response to vertical movements of the wheels while at the same time the wheels may be rotated about the axes of the king pins for steering purposes, all of which being accomplished without interfering with the drive mechanism for the wheels. In the embodiment of Figs. 11 and 12 the steering arm 43 is attached to the support bracket 26 near the upper end of the bracket above the universal joint 68 so as to avoid interference therewith.

I claim:

1. Supporting means for the wheel of a vehicle comprising an upright bracket having a wheel supporting spindle rigid therewith, said bracket comprising a pair of abutted pressed metal sections angular in cross section and rigidly secured together, each section forming a portion of the spindle and said portions being abutted and rigidly secured together.

2. Supporting means for the wheel of a vehicle comprising an upright channel-shaped bracket having a wheel supporting spindle rigid therewith, said bracket comprising a pair of pressed metal angle sections having their edges arranged in abutting relation and welded together to form a channel, and means for closing the upper and lower ends of said channel to provide mountings for swinging suspension arms.

3. Supporting means for the wheel of a vehicle comprising an upright bracket having a wheel supporting spindle rigid therewith, said bracket comprising a pair of pressed metal sections having their edges arranged in abutting relation and welded together to form a channel and a tubular portion of the spindle.

4. Supporting means for the wheel of a vehicle comprising two pressed metal sections welded together in abutting relation to form an upright inwardly opening channel having a central web, said sections also forming a tubular wheel spindle integral with said web.

5. Supporting means for the wheel of a vehicle comprising two pressed metal sections welded together in abutting relation to form an upright inwardly opening channel having a central web, said sections also forming a portion of a tubular wheel spindle integral with said web.

6. Supporting means for the wheel of a vehicle comprising an upright channel shaped bracket having a central web and inwardly directed side flanges, a hollow wheel spindle rigid at its inner end with said web and extending outwardly therefrom, and a brake backing plate abutting against the outer face of the web and rigidly secured thereto, said bracket comprising two similar pressed metal sections secured together along adjacent edges and integrally forming at least a portion of said spindle.

7. A wheel support comprising an upright channel-shaped bracket and a tubular wheel supporting spindle extending therefrom formed from two pressed metal sections, each section comprising as a unit substantially one half of the bracket and substantially one half of the spindle with the abutting edges of the sections welded together.

8. A wheel support comprising an upright channel-shaped bracket and a tubular wheel supporting spindle extending therefrom formed from two pressed metal sections, each section comprising as a unit substantially one half of the bracket and substantially one half of the spindle with the abutting edges of the sections welded together along lines lying in a common plane.

9. A wheel support compriting two pressed metal members welded together, each member comprising an angle portion and a semi-tubular spindle portion projecting therefrom, the corresponding edges of said portions of the two members being abutted and welded together to provide an upright generally channel-shaped bracket and a tubular spindle.

10. A wheel support comprising two pressed metal members welded together, each member comprising in a single stamping an angle portion and a semi-tubular spindle portion projecting therefrom, the corresponding edges of said portions of the two members being abutted and welded together along lines lying in a common plane to provide an upright generally channel shaped bracket and a tubular spindle.

11. A wheel support comprising two pressed metal sections each having an upright angle portion and a semi-tubular portion projecting therefrom, the corresponding edges of said portions of the two sections being butt-welded together to provide an upright generally channel-shaped bracket and a tubular wheel spindle.

12. A wheel support comprising two pressed metal sections each having an upright angle portion and a semi-tubular portion projecting substantially at right angles thereto, the corresponding edges of said portions of the two sections being butt-welded together along lines lying in substantially a common plane to provide an upright generally channel-shaped bracket and a tubular wheel spindle.

WILLIAM D. ALLISON.

REFERENCES CITED

The following references are of record in the file of this patent:

UNITED STATES PATENTS

| Number | Name | Date |
|---|---|---|
| 1,884,474 | Wolforth | Oct. 25, 1932 |
| 2,297,901 | Leighton | Oct. 6, 1942 |
| 2,122,476 | Leighton | July 5, 1938 |
| 1,892,479 | Arato | Dec. 27, 1932 |
| 2,094,824 | Sanford | Oct. 5, 1937 |
| 2,311,125 | Phelps | Feb. 16, 1943 |
| 2,011,121 | Sherman et al. | Aug. 13, 1935 |
| 2,154,817 | Leighton | Apr. 18, 1939 |

FOREIGN PATENTS

| Number | Country | Date |
|---|---|---|
| 503,877 | Great Britain | Apr. 17, 1939 |